United States Patent Office 3,441,138
Patented Apr. 29, 1969

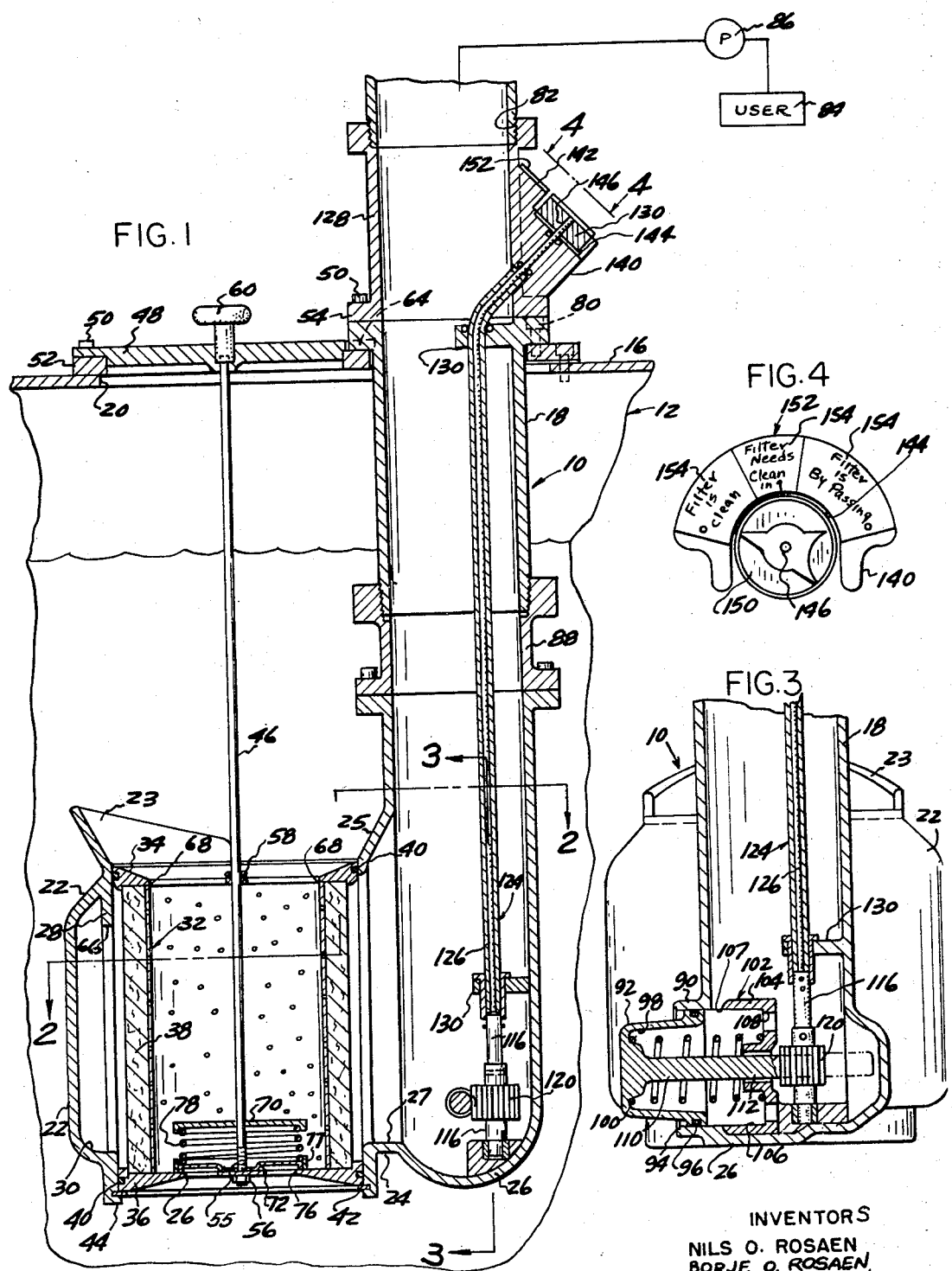

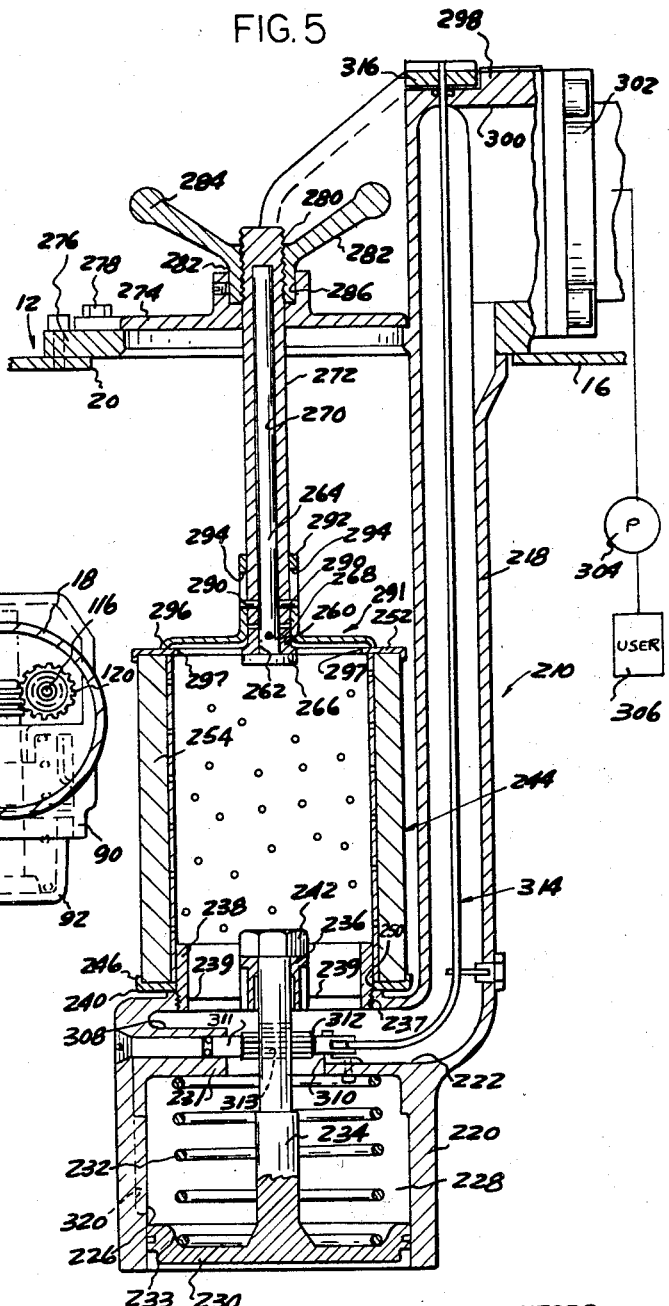

3,441,138
RESERVOIR FILTER AND INDICATOR
Nils O. Rosaen, Bloomfield Hills, Borje O. Rosaen, Ann Arbor, and Oscar B. Rosaen, Grosse Pointe, Mich., assignors, by mesne assignments, to Parker-Hannifin Corporation, Cleveland, Ohio, a corporation of Ohio
Filed Jan. 24, 1966, Ser. No. 522,774
Int. Cl. B01d 35/14, 35/02
U.S. Cl. 210—90                    9 Claims

ABSTRACT OF THE DISCLOSURE

A filter device is mounted to the top plate of a fluid reservoir and extends downwardly to position a filter element below the level of fluid in the reservoir. The filter element is supported by a housing mounted within the reservoir so that fluid is drawn from the reservoir through the filter element and through a tubular outlet structure connected with the housing. The filter element is removable vertically upwardly from the housing and from the reservoir. A gear driven indicator indicates the condition of the filter element exteriorly of the device.

---

The present invention relates to filter devices and more particularly to such a device adapted to be submerged in a fluid reservoir and constructed to permit continued operation of the system in which the device is connected as the filter element is removed for cleaning or replacement.

Heretofore a number of filter devices have been provided which have permitted continued operation of the system even as the filter element is being removed for purposes of cleaning or replacement. Each of these, however, has included some type of valve means that is operable upon being actuated to close off portions of the filter device and to redirect fluid directly from the inlet to the outlet. Such valve means, in addition to adding considerable cost to the filter devices by being expensive to manufacture and assemble, also are subject to malfunction. When the valve means become worn or when malfunction occurs, fluid continues to be drawn into the filter chamber as the filter element is removed and this can result in a substantial loss of system fluid and a difficult and time consuming clean-up operation. The system must be shut down of course while the valve means is repaired or replaced and this too results in loss of time and money.

Filter devices have also been heretofore provided in which the filter element is submerged within the fluid reservoir and fluid is drawn from the reservoir through the filter element to the fluid user. Such submerged type filter devices have the particular advantage that much of the housing that would otherwise be necessary is eliminated, thus resulting in substantial savings in manufacturing costs. The disadvantages inherent in such heretofore known submerged filter devices, however, has been that the filter element is generally quite difficult to remove from the device and it is required that the fluid system to which the devices are attached be completely shut down while portions of the reservoir and the device itself are dismantled to remove the element.

The present invention provides a submerged type filter device which overcomes these problems by providing a construction in which the filter element is disposed within the fluid reservoir in a position beneath the minimum level of fluid therein. One surface of the filter element is exposed to the fluid within the reservoir and an opposite surface connected through a fixed housing member to an outlet adapted for connection to a fluid user through a suction pump. Unlike previous submerged filter devices, however, means are provided for removing the filter element vertically upwardly from the reservoir without disturbing the housing structure so that upon such removal, fluid can be continued to be drawn from the reservoir and through the outlet to the fluid user.

This construction provides a device then which permits continued operation of the fluid system to which it is connected even with the filter element entirely removed from the device. Such a result is produced without the necessity of valves or the like for redirecting the fluid upon removal of the filter element and therefore without the added cost and dangers which ensue from such valves. Also, as will become more apparent as the description proceeds, the filter device of the present invention includes a novel means for visually indicating the condition of the filter element exteriorly of the fluid reservoir. This permits cleaning or replacement of the filter element prior to the element becoming unduly clogged. The filter device also includes means for automatically bypassing the filter element upon the filter element becoming clogged a predetermined degree.

It is an object then of the present invention to reduce the cost of providing continuous fluid systems by providing a filter device for such systems constructed to permit the filter element to be removed for cleaning or replacement without disrupting the operation of the system and without the necessity of providing valve means within the filter device for redirecting fluid as the filter element is removed.

It is another object of the present invention to improve the functioning of those filter devices provided with means for permitting removal of the filter element without interrupting the operation of the filter system by providing a new filter device constructed to automatically direct the fluid from the fluid reservoir and through the outlet of the device upon removal of the filter element without requiring the provision of valve means for this purpose.

It is yet another object of the present invention to improve filter devices of the aforementioned types by providing an improved means for indicating the clogged condition of the filter element of such devices, and also means for automatically bypassing the filter element when it has become clogged to a predetermined degree.

It is still another object of the present invention to improve submerged type filter devices by providing a construction for such devices which permits the filter element to be removed without disrupting the operation of the system through which the filter device is connected.

Still further objects and advantages of the present invention will readily occur to one skilled in the art to which the invention pertains upon reference to the following description. The description makes reference to the accompanying drawings in which like reference characters refer to like parts throughout the several views and in which:

FIG. 1 is a longitudinal cross sectional view of a preferred filter device of the present invention mounted in a fluid reservoir and illustrating other preferred components of the preferred system schematically.

FIG. 2 is a cross sectional view taken substantially at line 2—2 of FIG. 1.

FIG. 3 is a fragmentary cross sectional view taken substantially on line 3—3 of FIG. 1.

FIG. 4 is a fragmentary elevational view as seen substantially from line 4—4 of FIG. 1.

FIG. 5 is a longitudinal cross sectional view similar to FIG. 1 but illustrating another preferred embodiment of the present invention.

Now referring to the drawings for a more detailed description of the present invention, FIGS. 1–4 illustrate one preferred embodiment thereof as comprising a filter device 10 mounted to extend vertically into a fluid reservoir 12 from the top wall 16 thereof.

The filter device 10 preferably comprises a tubular housing member 18 extending into the reservoir 12 through an opening 20 provided in the top of the wall 16. A lower open top and open bottom cylindrical housing 22 is integrally joined with the lower end of the tubular housing member 18 and extends on an axis substantially parallel with the axis of the tubular housing member 18. The upper edge of the cylindrical housing 22 is formed with an arcuate semi-cylindrical extension 23 on the side opposite the tubular housing 18 and is disposed well beneath the minimum level of the fluid in the reservoir 12. As can best be seen in FIG. 2, the cylindrical wall forming the housing member 22 is joined with the cylindrical wall forming the tubular housing member 18 and as can best be seen in FIG. 1, a portion of the wall defining the tubular housing 18 is curved outwardly as at 25 to join the upper edge of the cylindrical housing 22. A wall 24 joins the lower portion of the housing 22 with an arcuate wall section 26 which closes the lower end of the tubular housing member 18. This forms a passage 27 providing open communication between the interior of the housing 18 and the housing member 22.

As can best be seen in FIGS. 1–2, an open top and open bottom inner cylindrical housing 28 is integrally joined with the cylindrical housing 22. The housing 28 is disposed radially inwardly of the housing 22, is coaxial therewith, and is joined thereto to provide a substantially annular chamber 30 disposed therebetween. The upper and lower edges of the outer cylindrical housing 22 curve inwardly to join the upper and lower edges of the inner housing 28 so that the chamber 30 is closed from communication with the interior of the reservoir 12 and is open to the passage 27.

As can best be seen in FIG. 1, the inner surface of the inner cylindrical housing 28 forms a guide surface for axially slidably receiving a filter assembly generally indicated by reference character 32. The filter assembly 32 preferably comprises an upper circular flange member 34, a lower circular flange member 36, and a cylindrical filter element 38 sandwiched therebetween and secured thereto by any convenient means such as a plurality of annularly spaced screws (not shown) extending from one of the flange members through the filter element 38 and received by the other flange member. The flange members 34 and 36 carry piston rings 40 which engage the inner surface of the inner housing member 28 to prevent fluid leakage therepast. A snap ring 42 disposed in a suitable annular recess 44 provided at the lower end of the housing 28 engages the lower edge of the flange member 36 to limit downward axial movement of the filter assembly 32 and to thereby maintain the filter assembly 32 within the inner housing 28.

An elongated rod 46 is carried by a cap member 48 which is mounted to the top wall 16 of the fluid reservoir by means of screws 50 some of which are received in a mounting member 52 encompassing the opening 20 and others of which secure the cap member 48 to a flange portion 54 of the tubular housing 18. The rod 46 extends axially into the fluid reservoir 12 and through the centers of the flange members 34 and 36. The lower end of the rod 46 is threaded as at 55 to receive a nut 56 which in combination with a snap ring 58 which bears against the upper surface of the upper flange member 34, locks the rod 46 to the filter assembly 32 and aids in locking the filter element 38 intermediate the flange members 34 and 36. The cap member 48 is preferably provided on its exterior surface with a handle portion 60 which aids in lifting the cap member from the top wall 16 of the reservoir 12. The cap member 48 is preferably formed with a peripheral extension 64 which receives those screws 52 carried in the flange 54 of the tubular housing 18 so that upon removal of the screws 50 and rotation of the cap member 48 the extension 64 will be rotated past the flange portion 54 to permit the cap member 48, the rod 46 and the filter assembly 32 to be moved vertically upwardly through the opening 20.

As can best be seen in FIGS. 1 and 2, the inner cylindrical housing 28 is provided with a plurality of annularly spaced slots 66 which afford communication between the interior of the housing 28 and the chamber 30. The upper circular flange member 34 is provided with a plurality of arcuate openings 68 which provide communication between the fluid reservoir and the interior of the filter element 38. The rod 46 carries a flanged circular spring seat member 70 in a fixed position axially inwardly spaced from the lower flange member 36. A circular valve member 72 is axially slidably mounted on the lower end of the rod 46 and interiorly of the lower flange member 36 and is provided with a peripheral flange portion 77 which when engaged with the interior surface of the lower flange member 36, closes a plurality of arcuate openings 76 provided in the lower flange member 36. A very light spring 78 biased between the spring seat 70 and the valve 72 is operable to urge the valve 72 to a position closing the openings 76.

The tubular housing member 18 extends upwardly from the top wall 16 and is preferably mounted to the top wall 16 in a fixed position by means of a plurality of screws 80 received by the mounting member 52. An outlet 82 is provided in the upper end of the tubular housing 18 and is adapted for connection to a fluid user 84 through a suction pump 86 as shown schematically in FIG. 1. The tubular housing 18 preferably comprises upper and lower sections joined by an intermediate section 88. This permits the depth at which the filter device will be carried within the fluid reservoir to be modified by replacing the intermediate section 88 with one of longer or shorter length.

As the invention has thus far been described, fluid is drawn by the pump 86 from the fluid reservoir axially inwardly through the openings 68 and 76 provided in the flange members 34 and 36 respectively. The spring 78 is very light and permits the valve member 72 to be normally open when fluid is being drawn by the pump 86 through the device. Fluid passes from the interior of the filter element 38 radially outwardly through the slots 66 through the chamber 30 and through the passage 27 axially upwardly through the vertically extending tubular housing 18 and through the outlet 82 to the fluid user 84. When it is desired to remove the filter element for cleaning or replacement the screws 50 are removed, the cap member 48 is rotated past the flange portion 54, and then pulled vertically upwardly away from the reservoir 12 to pull the filter assembly 32 from the inner cylindrical housing 28 and from the reservoir 12. As the filter assembly 32 is being pulled upwardly through the fluid the valve member 72 will be closed by the force of the fluid and the spring 78 to close the opening 76 and to thereby prevent contaminants collected within the filter element from falling back into the fluid reservoir 12. Since during the removal of the filter element the slots 66 and the chamber 30 remain below the level of the fluid within the reservoir 12 and these in effect form an inlet of the device when the filter element is removed, the fluid can be cotninued to be drawn from the reservoir by the fluid pump 86 even while the element is removed.

The arcuate section 23 aids in directing the filter assembly 32 back into the housing 28 when it is desired to do so and the valve member 72 insures that air which might otherwise become trapped beneath the filter assembly 32 as it is replaced will escape to the top of the reservoir.

Thus it is apparent that a filter device has been described which permits continuous operation of the system and yet in which all of the advantages of submerged type filter devices are provided.

Unlike my previous similar devices expensive valve means are not required and there is no danger of malfunction to create a difficult clean-up problem or render the device inoperative.

The filter device of the present invention also includes a novel means for indicating the condition of the filter element and a bypass means automatically operable to open a bypass directly from the interior of the reservoir to the interior of the tubular housing 18 bypassing the filter element 38 upon a predetermined increase in the pressure differential across the filter element 38. Since the pressure differential across the filter element will increase as the filter element becomes clogged, the bypass path will therefore open upon the filter element becoming clogged a predetermined amount and before the filter element reaches a clogged condition which either diminishes flow to too great an extent or is in danger of rupturing.

As can best be seen in FIGS. 2 and 3, the lower portion of the tubular housing 18 is provided with an outwardly formed substantially cylindrical extension 90 which opens on one side to the fluid reservoir 12 and on the opposite side to the interior of the tubular housing 18. A piston 92 is axially slidably received on the inner surface of the extension 90 to normally close the opening provided thereby. A snap ring 94 carried on the inner surface of the extension 90 limits outward axial movement of the piston 92. The piston 92 is provided with a piston ring 96 which engages the inner surface of the extension 90 to prevent fluid leakage therepast. The piston 92 is preferably cup shaped to provide an inner annular recess 98 which receives one end of a spring 100. The opposite end of the spring 100 seats against a substantially circular spring seat 102 formed in the interior of the vertical housing 18. The spring seat 102 is formed with a cylindrical peripheral extension 104 which provides an inner surface 106 for axially slidably receiving the piston 92 upon sufficient axial inward movement of the piston 92. The spring seat 102 is also provided with a plurality of peripheral slots 107 and openings 108 which permit fluid passage therethrough.

The piston 92 includes an inner axially extending shaft portion 110 extending through a central opening 112 provided in the spring seat 102 and formed adjacent its inner end with a plurality of transversely extending teeth 114 as can best be seen in FIG. 2.

A shaft 116 is journaled in the inerior of the housing 18 and disposed to position the shaft 116 on an axis substantially normal to the shaft portion 110 of the piston 92. The shaft 116 carries a gear member 120 in a position such that the teeth of the gear member 120 mesh with the teeth 114 formed on the shaft portion 110 of the piston 92 to form gear and rack arrangement whereby axial movement of the piston 92 produces a corresponding rotation of the gear 120 and a shaft 116. As can best be seen in FIGS. 1 and 3, the upper end of the shaft 116 is fixed axially to a cable assembly 124. The cable assembly 124 is similar in construction to a conventional speedometer cable and therefore rotation of the shaft produces rotation of the inner member 126 of the assembly 124. The cable assembly 124 extends upwardly through the vertically extending tubular housing 18. An outer housing member 128 mounted to the exterior end of the housing 18. The assembly 124 is mounted by suitable brackets 130 formed in the tubular housing 18 at points along the axial length thereof.

As can best be seen in FIGS. 1 and 4, the exterior portion 128 of the housing 18 is provided with an angularly extending boss portion 140 which forms a flat arcuate exterior surface 142 and an adjacent substantially circular recess 114. A shaft 146 is rotatably mounted in the boss portion 140 and has fixed at its exterior end a pointer element 150 carried in the recess 144. The interior end of the shaft 146 is connected to the inner member 126 of the cable assembly 124 so that rotation of the inner member 126 produces a corresponding rotation of the shaft 146 and of the pointer element 158. An indicator plate 152 is carried on a flat surface 144 and as can best be seen in FIG. 4, is provided with suitable indicia 154 for indicating the condition of the filter element.

It is apparent that as the pressure differential across the filter element 38 increases by reason of the filter element 38 becoming clogged, the increase in pressure differential will also be present across the piston 92. This pressure differential will cause the piston 92 to be moved axially inwardly against the force spring 100 producing an axial movement of the shaft portion 110 which corresponds with the change in the condition of the filter element 38. This movement of the piston 92 will be transmitted through the gear and rack assembly comprised of the teeth 114 on the shaft portion 110 and the gear 120 carried by the shaft 116, through the cable assembly 124 to produce a corresponding rotational movement of the pointer element 150. Thus with proper indicia 154 provided on the indicator plate 152 the condition of the filter element will be indicated exteriorly of the fluid reservoir 12.

When the filter element has reached a predetermined clogged condition the piston 92 will have moved axially inwardly sufficiently to bring the piston ring 96 past the inner end of the extension and into the extending portion 104 provided by the seat member 102. This will open a fluid path directly from the interior of the reservoir 12 to the interior of the tubular housing 18 bypassing the filter element 38.

FIG. 5 discloses a filter device similar to the embodiment described above but in which fluid flow is directed radially inwardly through the element of the device rather than outwardly through the device as in the embodiment above.

Referring to FIG. 5, another preferred filter device 210 is illustrated as being mounted to extend vertically into the fluid reservoir 12 from the top wall 16 thereof.

The filter device 210 preferably comprises a tubular housing member 218 extending into the reservoir 12 through an opening 20 provided in the top of wall 16. The tubular housing 218 is integrally joined at its lower end with an inner housing member 220. A passage 222 connects the interior of the housing 218 with the interior of the inner housing 220. The inner housing 220 is substantially cylindrical in form and is disposed on an axis parallel to but off set from the axis of the tubular housing 218 so that the inner housing 220 is disposed at the lower end of the housing 218 in a substantially side by side relationship thereto. The lower end of the inner housing 220 is provided with an inner annular surface 226 which defines a chamber 228. A piston 230 is axially slidably received by the surface 226 and normally closes the chamber 228 from communication with the reservoir 12. An inwardly extending radial flange portion 231 provided in the inner housing 220 and extending across the upper end of the chamber 228 provides a seat for one end of the spring member 232, the opposite end of which is received in an annular recess 233 formed in the interior surface of the piston 230. The piston 230 is formed with an inwardly axially extending shaft 234 which extends through a hub portion 236 of a cylindrical member 238.

The cylindrical member 238 is provided with radial arms 239 connected to the hub portion 236 and is threaded at its lower end as shown at 237 to be received by an externally threaded portion 240 of the inner housing 220. The upper end of the shaft 234 receives a nut 242 which limits downward axial movement of the shaft 234 with respect to the hub portion 236 and also limits downward axial movement of the piston 230 as produced by the spring 232.

A substantially cylindrical filter assembly 244 similar to that described above is axially slidably received on the exterior surface of the cylindrical member 238 and preferably comprises a lower flange member 246 having a central opening 250 to be received by the cylindrical member 238, an upper flange member 252 and a substantially cylindrical filter element 254 sandwiched between the flange members 246 and 252 and secured thereto by any means such as a plurality of annularly spaced screws (not shown).

The upper circular flange member 252 is provided with an upturned central portion 260 forming an opening 262. A rod 264 extends through the opening 262 and is locked to the flange member 272 by an enlarged head portion 266 disposed inwardly of the flange member 252 and a cross pin 268. The rod 264 extends axially upwardly into an axial bore 270 provided in a rod 272. The rod 272 extends through a cap member 274 which is mounted to the exterior surface of the top wall 16 of the reservoir 10 by means of a mounting member 276 encompassing the opening 20 and by screws 278 received in the mounting member 276. The exterior end of the rod 272 is externally threaded as at 280 to receive a nut member 282 provided with grasing portions 284 to aid in turning the nut on the rod 272. The lower portion of the nut 280 is received in a recess 286 provided in the exterior surface of the cap member 274. The lower end of the rod 272 is provided with a pair of cross pins 290 which extend radially outwardly from the exterior surface thereof but which do not extend inwardly sufficiently to interfere with axial movement of the inner rod 264.

An inverted cup shaped member 291 is axially slidably carried on an exterior surface of the rod member 272 and is provided with an axial cylindrical extension 292 having axial slots 294 therein to receive the cross pins 290. The radially outermost edge of the cup member 291 is provided with a downwardly turned peripheral portion 296 which is adapted to engage the exterior surface of the flange member 252. The flange member 252 is provided with a plurality of arcuately spaced openings 297 which when the cup member 291 is in the position illustrated in FIG. 5 are closed by the cup member 291.

The exterior portion of the tubular housing 218 is provided with a radially formed portion 298 which defines an outlet chamber 300 registering with the interior of the tubular housing 218 and having an outlet 302 adapted for connection through a pump 304 with a fluid user 306.

The inner housing 220 is provided with mounting portions 308 and 310 which provide the means for rotatably carrying a shaft 311 transversely to and closely adjacent to shaft portion 234 of the piston 230. The shaft 311 carries a gear portion 312 and the shaft portion 234 of the piston 230 carries a plurality of teeth 313 in engagement with the gear portion 312 so that axial movement of the piston 230 produces a corresponding rotational movement of the shaft 311 substantially as described above with respect to FIGS. 1–4. Also, as described above, one end of the shaft 311 is secured to a cable assembly 314 which extends through the tubular housing 218 and is connected at its upper end with a pointer element 316 operable to indicate the position of the piston 230 and thus the condition of the filter element 254 as described above.

It is apparent then that fluid is normally drawn by the pump 304 radially inwardly through the filter element 254 axially downwardly through the cylindrical member 238 and through the passage 222 into the interior of the tubular housing 218 to the outlet 302. As the filter element 254 begins to become clogged, a pressure differential is produced across the element 254 substantially as described above. Since the interior surface of the piston 230 is exposed to fluid on the outlet side of the filter element 254 and the exterior surface thereof is exposed to fluid within the reservoir 12 or on the inlet side of the filter element 254, this increased pressure differential will produce a corresponding axial movement of the piston 230. The movement of the piston 230 which is in correspondence with the clogged condition of the filter element 254 will be trasnmitted through the gear and rack assembly 312–313 and the cable assembly 314 to the pointer element 316 to indicate the condition of the element 254 exteriorly of the reservoir 12, all as described above.

The surface 226 defining the chamber 228 is axially grooved as illustrated at 320 to provide a bypass passage opening directly between the reservoir 12 and the interior of the tubular member 218 upon the piston 230 being moved to a predetermined axial position. Thus as the filter element 254 becomes unduly clogged, the bypass path will be open as in the filter device described above.

When it is desired to remove the element 254 for cleaning or replacement the screws 278 are removed to loosen the cap member 274 from the mounting member 276 and the nut 282 is rotated to draw the outer rod 272 upwardly from the reservoir 12. The rod 272 will be moved upwardly without affecting the filter assembly until the cross pins 290 reach the uppermost limit afforded by the axial slots 294. Further axial movement of the outer rod 272 after the pins 290 have traveled the extent permitted by the slots 294 will cause the pins 290 to bear against the upper edge of the slots 294 to force the cup member 291 from the sealing engagement with the upper surface of the flange member. Breaking of this seal would be difficult otherwise for the pressure differential across the seal is quite high. The cap member 274, the outer rod 272, and the cup member 291 then are removed vertically upwardly to leave the inner rod 264 exposed. The inner rod 264 is then grasped to remove the filter assembly 244 from the device. As this is being done, fluid will continue to flow through the interior of the filter element and as the filter element is moved upwardly past the cylindrical member 238 it will also flow from beneath the filter element 254 to the outlet 302 so that the system can continue to operate as the filter element is being removed.

After the filter element has been replaced or cleaned, the rod 264 is used to insert the filter assembly 244 back over the cylindrical member 238. The openings 297 in the upper flange member 252 provide means for permitting air which might otherwise become entrapped in the interior of the element 254 as it is being replaced to escape. The outer rod 272 is then positioned over the inner rod 264 and the nut 282 rotated to urge the cup member 291 downwardly against the upper surface of the flange member 252. The pressure differential which is produced across the cup member 291 will provide sealing engagement which will close the openings 297.

It is apparent that filter devices have been described in which the advantages of submerged type filters are inherent in the devices but yet in which the filter elements can be readily removed and in which removal of the elements does not disrupt operation of the system. It is also apparent that a novel indicating means has been disclosed of the reservoir. It is further apparent that although we have described but a single embodiment of our invention many changes and modifications can be made therein without departing from the spirit of the invention as expressed by the scope of the appended claims.

We claim:
1. A filter device mounted to the top of a closed fluid reservoir and extending downwardly into the reservoir comprising:
 (a) a housing disposed within said reservoir below the level of fluid therein,
 (b) said housing forming a chamber and a tubular member connected with said housing and extending through the top of said reservoir to provide an outlet passage connected with said chamber,
 (c) said housing having an open top to provide an inlet means connecting the interior of said reservoir with said chamber,
 (d) a filter assembly and means formed in said housing for removably mounting said filter assembly within said open top in a position adjacent to and parallel with said tubular member.
 (e) said reservoir having an opening axially aligned with the open top in said housing for removing said filter assembly vertically from said reservoir.

2. The filter device as defined in claim 1 and including pressure responsive means carried by said housing and operable upon a predetermined increase in the pressure differential across said filter assembly to open a bypass path directly from the interior of said reservoir to said chamber.

3. The filter device as defined in claim 1 and including pressure responsive means carried by said housing and movable in response to changes in the pressure differential across said filter assembly, and means connected to said pressure responsive means to indicate the position thereof exteriorly of said reservoir.

4. The filter device as defined in claim 2 and including means connected with said pressure responsive means and operable to indicate the position of said pressure responsive means exteriorly of said reservoir.

5. The filter device as defined in claim 1 and in which said filter assembly comprises:
  (a) a first flanged member, a second flanged member and a cylindrical filter element disposed therebetween,
  (b) said first flanged member having an opening registering with the interior of said reservoir and the interior of said filter element, and
  (c) means provided in said housing directing fluid from the exterior surface of said filter element to said outlet passage.

6. The filter device as defined in claim 1 and in which said filter assembly comprises:
  (a) a first flanged member, a second flanged member and a cylindrical filter element disposed therebetween,
  (b) the exterior surface of said filter element being exposed to fluid within said reservoir,
  (c) said second flange member having an opening, and
  (d) means provided in said housing for directing fluid from said opening to said outlet passage.

7. The device as defined in claim 1 and including:
  (a) said tubular member having an opening intermediate the interior of said reservoir and said outlet passage, and
  (b) a normally closed pressure responsive valve means carried in said opening.

8. The device as defined in claim 7 and including means operably connected to said valve means to indicate the position thereof exteriorly of said reservoir.

9. A filter device mounted to the top of a closed fluid reservoir and extending downwardly into the reservoir comprising:
  (a) a housing disposed within said reservoir below the level of fluid therein,
  (b) said housing forming a chamber and means connected with said housing and extending through the top of said reservoir to provide an outlet passage connected with said chamber,
  (c) said housing having an open top to provide an inlet means connecting the interior of said reservoir with said chamber,
  (d) a filter assembly and means formed in said housing for removably mounting said filter assembly within said open top of said housing,
  (e) said reservoir having an opening axially aligned with the open top in said housing for removing said filter assembly vertically from said reservoir, and
  (f) said filter assembly including a filter element having an open center registering with the fluid in said reservoir through said open top of said housing whereby fluid flows from said reservoir through said open top and into said open center of said filter element and outwardly through said filter element to said outlet means.

References Cited

UNITED STATES PATENTS

| | | | |
|---|---|---|---|
| 1,793,080 | 2/1931 | Glover | 210—236 |
| 1,817,572 | 8/1931 | Linley et al. | 210—172 |
| 2,358,748 | 9/1944 | Thompson | 210—172 |
| 2,795,332 | 6/1957 | Burla | 210—172 X |
| 3,288,290 | 11/1966 | Rosaen | 210—90 |

SAMIH N. ZAHARNA, *Primary Examiner.*

U.S. Cl. X.R.

210—172, 238